United States Patent [19]

Elhaus

[11] Patent Number: 4,526,073
[45] Date of Patent: Jul. 2, 1985

[54] METHOD AND AN APPARATUS FOR SHEARING HEATED METAL BARS TO BILLETS

[76] Inventor: Friedrich W. Elhaus, Dorfstr. 21, 7761 Moos, Fed. Rep. of Germany

[21] Appl. No.: 483,590

[22] Filed: Apr. 11, 1983

[30] Foreign Application Priority Data

Apr. 28, 1982 [DE] Fed. Rep. of Germany ....... 3215798

[51] Int. Cl.³ ............................................. B23D 25/16
[52] U.S. Cl. ......................................... 83/15; 83/170; 83/212; 83/363; 83/364
[58] Field of Search .................. 83/15, 170, 364, 365, 83/363, 361, 370–372, 209–212

[56] References Cited

U.S. PATENT DOCUMENTS

| | | | |
|---|---|---|---|
| 3,422,711 | 1/1969 | Toney et al. | 83/15 |
| 3,841,180 | 10/1974 | Gutlbauer | 83/15 |
| 4,152,959 | 5/1979 | Elhaus | 83/372 |
| 4,328,725 | 5/1982 | Gschwend | 83/364 X |

*Primary Examiner*—James M. Meister
*Attorney, Agent, or Firm*—Laubscher Philpitt & Laubscher

[57] ABSTRACT

A method is disclosed of shearing heated metal bars to form billets, using a hot shearing apparatus. The bars are heated or kept warm in an oven upstream of the hot shearing apparatus, and the bar column normally is conveyed back into the oven after a shearing procedure. The bar length differs from an integer multiple of the billet length, and in passing over to a subsequent bar, a remnant of the preceding bar is combined with an initial piece of the subsequent bar to form a billet of the billet length prescribed. In this context the handling, above all upstream of the shearing edge is simplified in that the final section to be sheared of the first bar always is advanced beyond the shearing edge up to a predetermined length limit, the occurrence of the butt joint between the two successive bars is detected at a metering station located approximately one billet length upstream of the shearing edge, and upon detection of a butt joint, the bar column always is left in front of the shearing edge, rather than being conveyed back into the oven.

12 Claims, 46 Drawing Figures

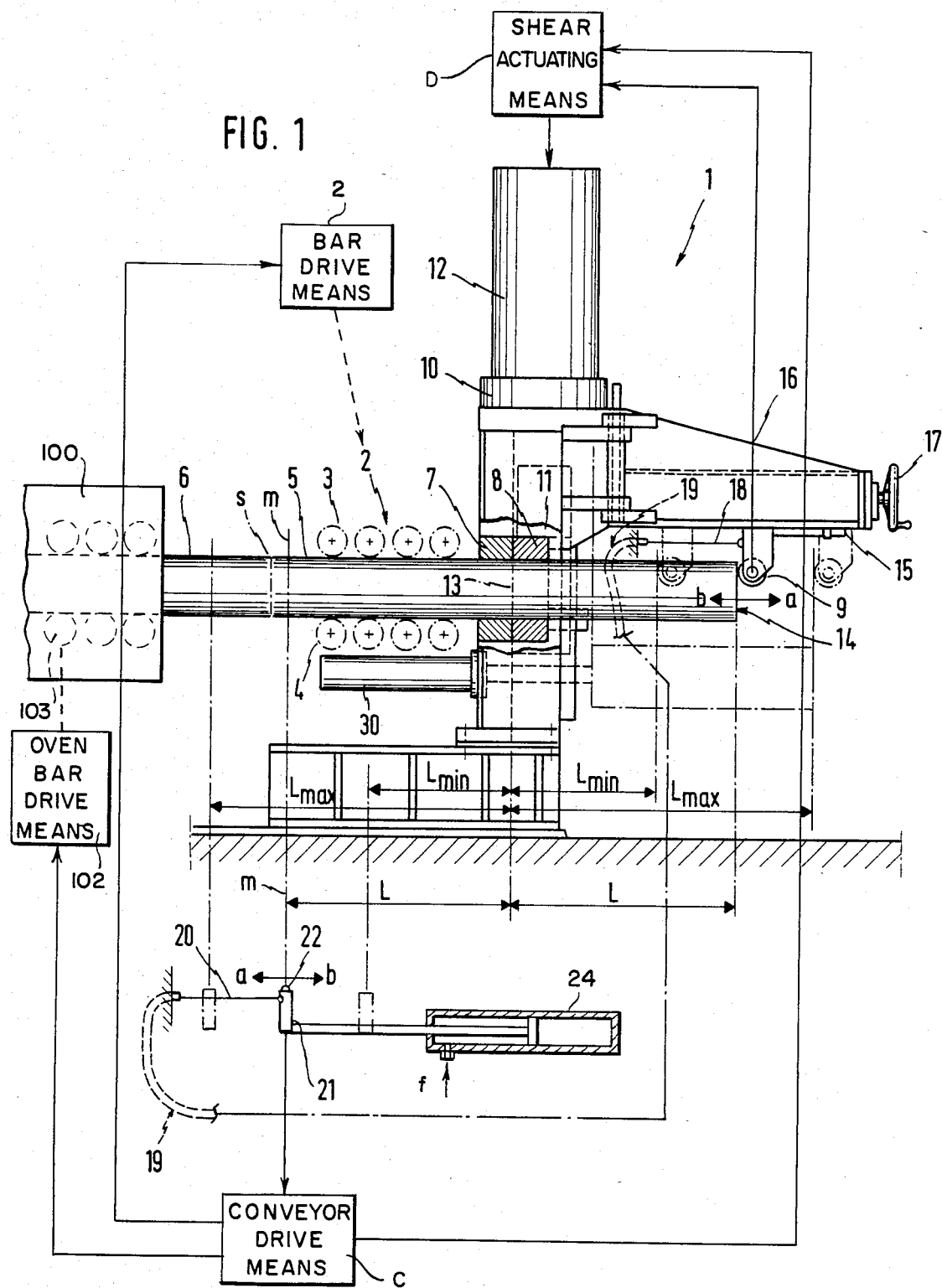

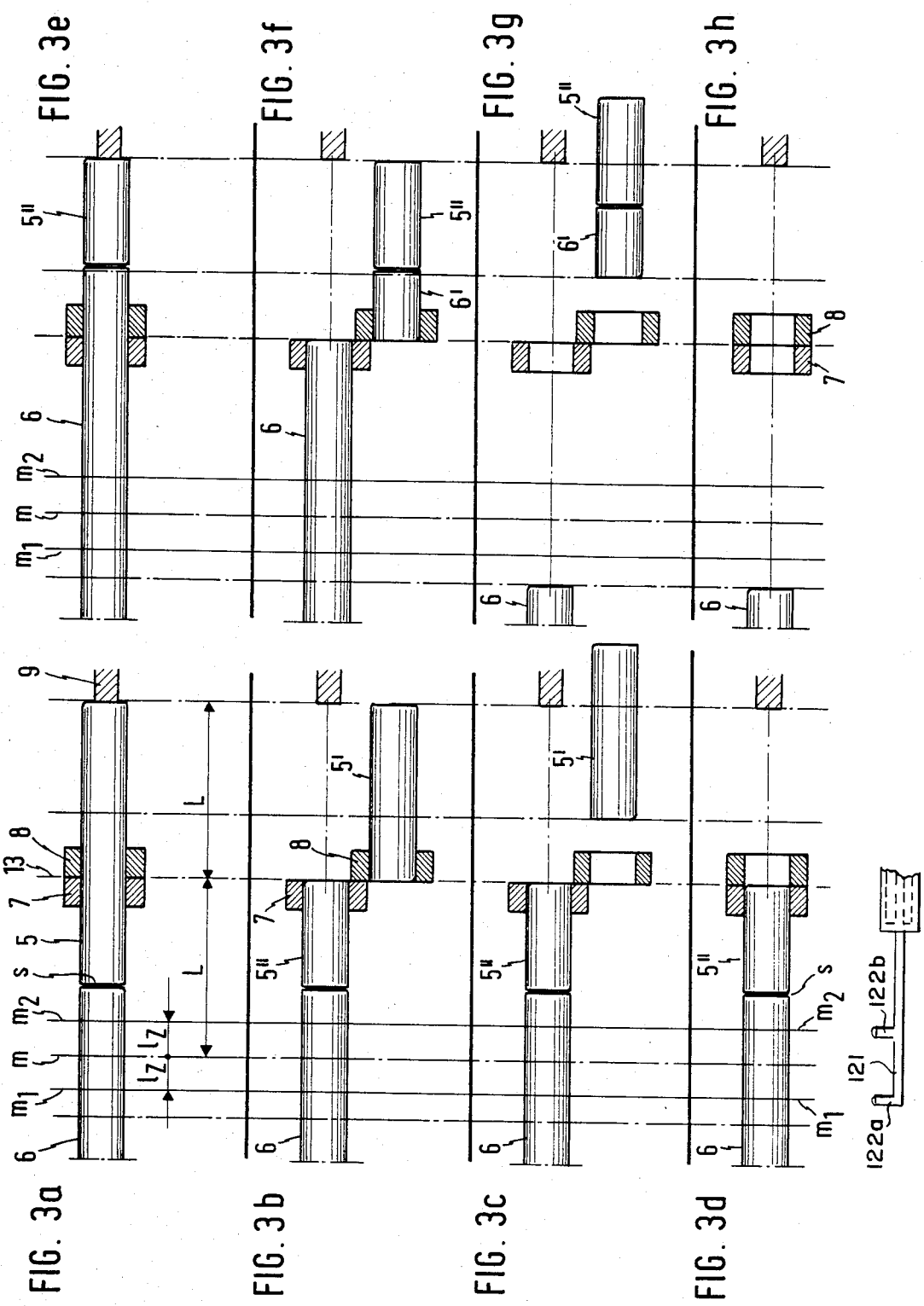

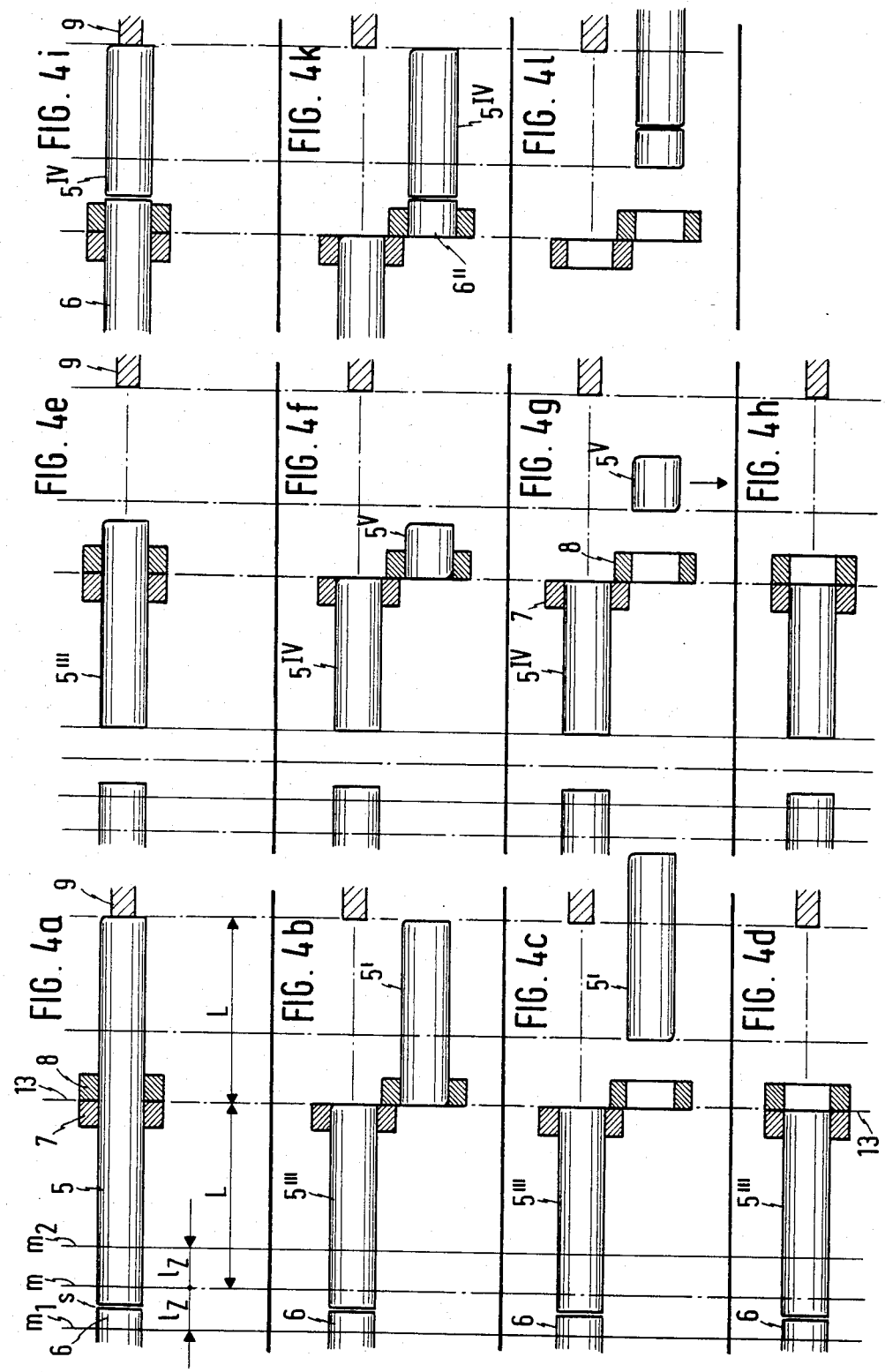

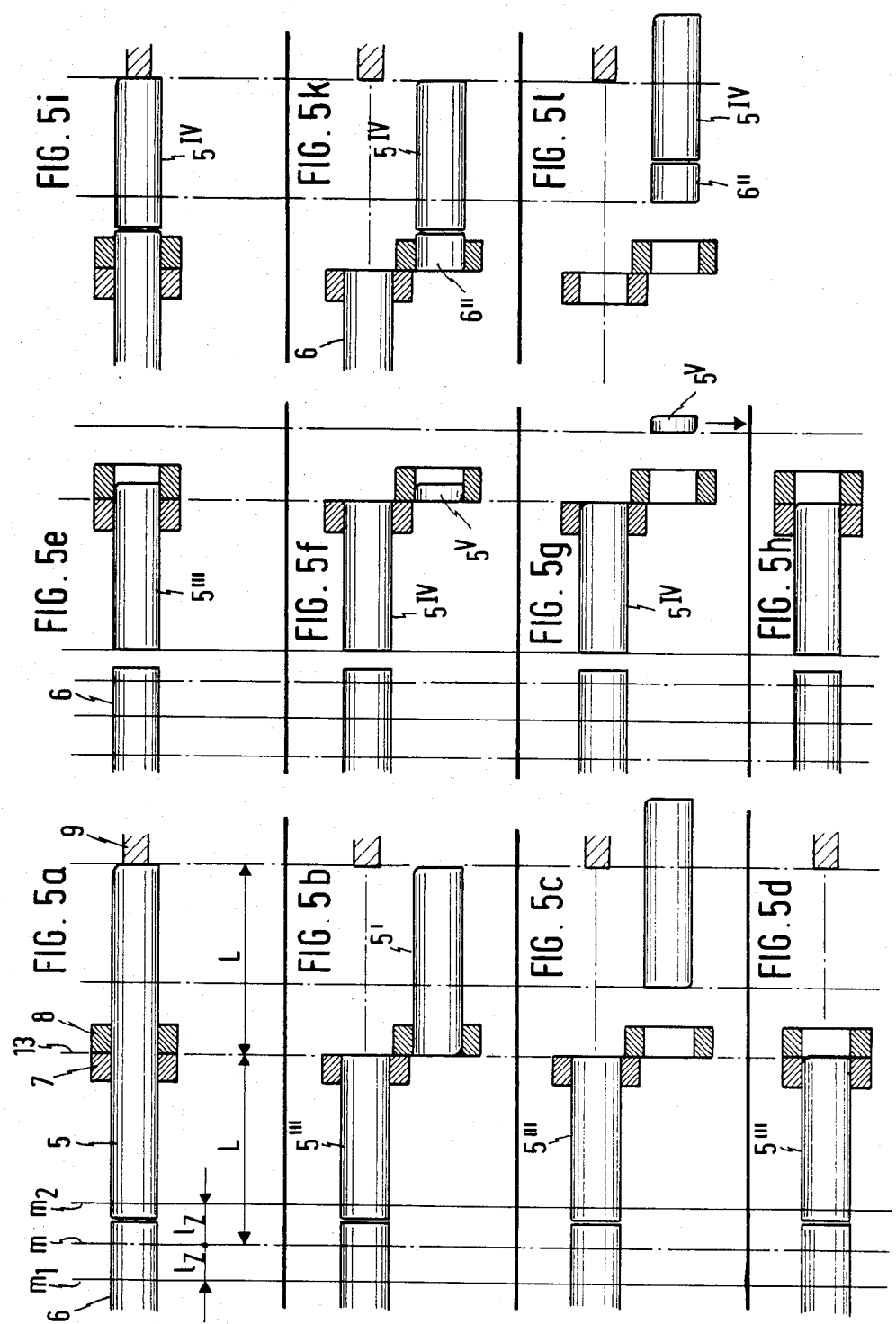

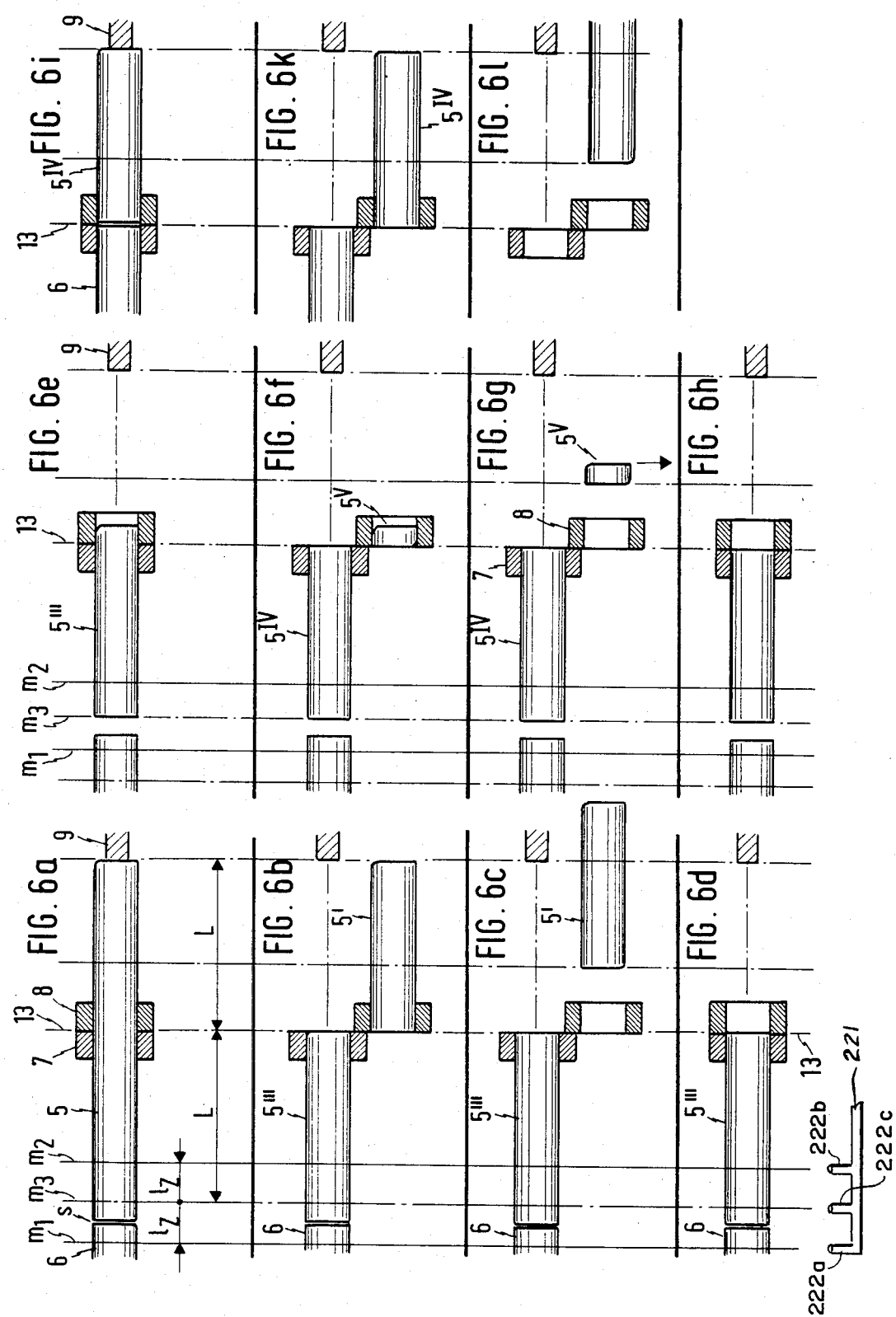

METHOD AND AN APPARATUS FOR SHEARING HEATED METAL BARS TO BILLETS

FIELD OF THE INVENTION

The instant invention relates to a method for shearing heated metal bars to form billets, using a hot shearing apparatus. As disclosed in my prior U.S. Pat. No. 4,152,959, the bars are heated or kept warm in an oven upstream of the hot shearing apparatus, and the bar column normally is conveyed back into the over after a shearing procedure. The bar length differs from an integer multiple of the billet length, and in passing over to a subsequent bar, a remnant of the preceding bar is combined with an initial piece of a subsequent bar to form a billet having the prescribed billet length.

BACKGROUND OF THE INVENTION

When using a method of the kind described which has been applied in practice, the bar column always is conveyed back into the oven oven if a relatively short final section only is to be sheared from the first bar. In this case remnants may be produced which cause difficulties because of their short lengths when being transported into the oven.

SUMMARY OF THE INVENTION

It is, therefore, an object of the invention to provide a method of the kind specified initially with which difficulties are avoided in handling remnants in the range of the hot shearing apparatus.

To meet this and other objects which will become apparent as the specification proceeds, it is provided with a method of the kind specified initially that, in accordance with the invention, the final section to be sheared of the first bar always is moved up to a predetermined length limit, the occurence of the butt joint between the two successive bars is detected at a metering station located approximately one billet length upstream of the shearing edge, and upon detection of a butt joint, the bar column always is left in front of the shearing edge rather than being conveyed back into the oven.

The method according to the invention above all serves to avoid difficulties which are encountered in the area in front of the shearing edge when relatively short remnants are conveyed back into the oven. This is achieved specifically by the measure of detecting a butt joint as early as in the zone of two billet lengths upstream of the length stop and of leaving the bar column including a remnant of the first bar in front of the shearing edge if such a butt joint is detected. In other words, there is no transportation back into the oven in this case so that no difficulties can be caused by any conveyance of short remnants back into the oven. With the method according to the invention the end of the bar column, including a remnant at that end remain outside of the oven for a longer period of time than usual and, therefore, may cool off more if relatively short remnants exist. This, however, is deliberately put up with and has not proved to be a disadvantage in operation.

In accordance with an advantageous modification of the method according to the invention a metering station is located one billet length plus an admissible remnant length upstream of the shearing edge. In this manner a butt joint is detected which, upon reaching the length limit, may be located between the shearing edge and by a length in front of the same which corresponds to a billet length plus the admissible remnant length. In this case the bar and billet handling means will be initiated automatically. The admissible remnant length is so selected that it will just permit satisfactory handling in the area in front of the shearing edge.

The invention also is destined to help avoid difficulties in handling remnants behind the shearing edge, in other words in the area between an extruder and the hot shearing apparatus. For this purpose a further development of the invention provides for a second metering station to be located by one billet length minus an admissible remnant length upstream of the shearing edge. With this modified method it can be determined whether or not there is a butt joint between the two metering stations when the bar column has been moved to abut against the length limit.

In this case it is convenient to provide not only the aforementioned bar and billet handling means but also to see to it that upon shearing of the final section which has been advanced up to the length limit and provides a normal billet length, the remaining remnant is conveyed from the butt joint past the shearing edge by such a distance that the remnant will stop upstream of the shearing edge by a length which is shorter than the correct billet length by the admissible remnant length. In this position a piece of scrap is sheared from the remnant and, during the next shearing process, an initial piece of the permissible remnant length is sheared from the subsequent bar to supplement the remnant to the billet length prescribed.

It is advantageous to select the permissible remnant length to be deducted from the billet length such that difficulties in the transportation of a remnant of such critical length are just avoided in the area behind the shearing edge. Conveniently but not necessarily this admissible remnant length may be selected to be the same as the admissible remnant length by which the billet length spacing of the first metering station from the shearing edge is increased.

This method just described which serves to avoid difficulties in the handling downstream of the shearing edge is significant.

The apparatus for shearing metal bars heated in an oven to form billets by means of a hot shearing apparatus, including the detection of a butt joint between two successive bars in an area upstream of the shearing edge at least at one metering station, is characterized, in accordance with the invention, in that a sensor each is provided at the or each metering station and activated directly by the passing of the butt joint between two successive bars. The sensor(s) emits or emit one or more control signals to stop a conveying means for the bar column disposed upstream of the hot shearing apparatus and to release a cutting motion of the shearing members of the hot shearing apparatus.

Conveniently, the sensors may be embodied by light barriers as this permits the formation of a genuine gap between the two butt joints. To this end the conveying means comprises a drive unit which is adapted to be driven at greater speed than the normal speed of the bar column such that a gap is formed when a butt joint arrives, which gap is detectable by the light barriers.

A hot shearing apparatus normally comprises a length stop which is adjustable to different billet lengths. In this event it is preferred in accordance with the invention, to provide a transmission for automatically adjusting the mean spacing of the two metering stations from the shearing edge when the length stop is adjusted such that the mean spacing always will correspond to the billet length set.

In a preferred embodiment this transmission comprises a Bowden cable which is fixed by one driven end to the length stop and by the other end to a sensor support.

Conveniently, the end of the Bowden cable fixed to the sensor support is displaceable by spring force, particularly of a compressed air spring as the Bowden cable is pushed in at the end fixed to the length stop.

BRIEF DESCRIPTION OF THE DRAWING

In order that the invention may be clearly understood and readily carried into effect several embodiments will now be described, by way of example, with reference to the accompanying drawings, in which:

FIG. 1 shows a first embodiment of an apparatus according to the invention;

FIGS. 2 ∝ 5 are very diagrammatic representations of parts of the apparatus shown in FIG. 1, including a modification, wherein

FIGS. 3a–3h show the process steps in an operating cycle of the modified apparatus when a butt joint occurs between the shearing edge of the hot shearing apparatus and a location corresponding to the billet length minus an admissible remnant length upstream of the shearing edge;

FIGS. 4a–4l show the process steps in an operating cycle of the modified apparatus of FIG. 1 when a butt joint occurs more than one billet length upstream of the shearing edge within the measuring range shown;

FIGS. 5a–5l show the process steps in an operating cycle of the modified apparatus of FIG. 1 when a butt joint occurs in an area upstream of the shearing edge, which area is shorter than the billet length by no more than the admissible remnant length;

FIGS. 6a–6l show the process steps in an operating cycle of an apparatus according to the invention, further modified as compared to FIG. 4.

DESCRIPTION OF THE PREFERRED EMBODIMENTS

Figure 2A:
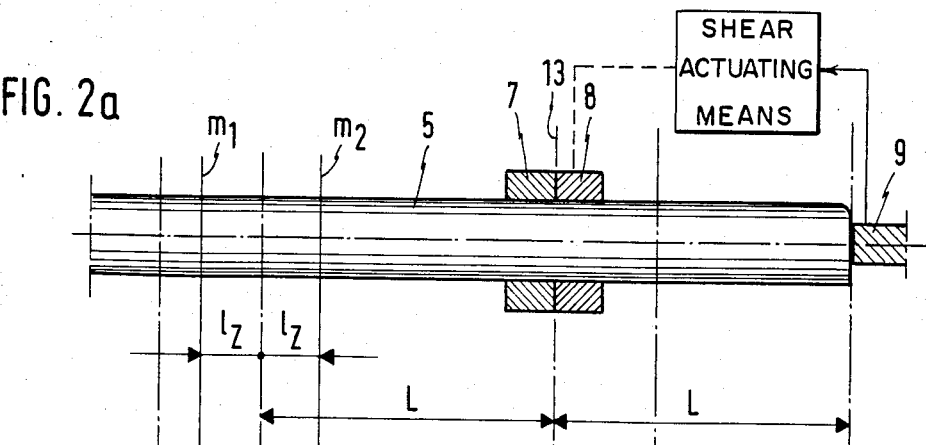
FIGS. 2a–2d show the process steps in an operating cycle of normal shearing, without the occurrence of a butt joint between two successive bars, of the apparatus shown in FIG. 1 as modified.

As shown in FIG. 1, the hot shearing apparatus generally indicated by reference numeral 1 comprises a conveying means including a first drive unit 2. This drive unit 2 has an upper drive roller set 3 and a lower drive roller set 4 for a bar column which is composed of a final section of a first bar 5 and an initial section of a second bar 6. At their end faces the bars 5, 6 are in mutual abutment in a butt joint s. The greater part of the bar 6 still is in the oven 100 where it is heated to the desired press temperature. The oven includes oven bar drive means 102 for operating conveyor means 103 to displace the bar into or out of the oven.

The first convenying means 2 transports the bar column 5, 6 through two shearing rings 7, 8 of the hot shearing apparatus 1 against an adjustable length stop 9 shown in FIG. 1 in continuous lines as adjusted to a mean billet length L to be sheared. Further shown, in discontinuous lines, are two terminal positions corresponding to a minimum billet length $L_{min}$ and a maximum billet length $L_{max}$.

The front shearing ring 7 is supported firmly in the shear housing 10. The rear shearing ring 8 is supported in a shearing ring holder 11 guided for vertical movement at the shear housing 10. A vertical shearing movement is exerted on this shearing ring holder 11 by means of an hydraulic system 12, displacing the shearing ring 8 downwardly out of a position of alignment with the fixed shearing ring 7. This causes a billet to be sheared along the shearing edge 13.

The shearing process normally is not released until the front end face 14 of the bar column has moved up against the length stop 9. The length stop 9 is guided by a displaceable but lockable carriage 15 along a fixed guide means 16 between the two limit positions corresponding to $L_{min}$ and $L_{max}$ and is adjustable, for instance, by means of a hand wheel 17 acting on a spindle (not shown).

One end 18 of the cable core of a Bowden cable, generally designated 19, is fixed to one end of the length stop 9. The other end 20 of this Bowden cable acts on a sensor support 21. This sensor support 21 carries an optical sensor 22 whose effective direction is indicated by dash-dot line m and which permits the detection of a butt joint s between the bar sections 5, 6. The sensor carrier 21 is movable along a compressed air cylinder 24 in the direction of an arrow a when adjusting the length stop 9 to the right, as seen in FIG. 1, i.e. in the direction of the maximum billet length $L_{max}$ (pulling out the cable core of the Bowden cable 19), and in the direction of an arrow b when adjusting the length stop 9 to the left, as seen in FIG. 1, toward the minimum billet length $L_{min}$ (pushing in the cable core of the Bowden cable 19). Movement in the direction of arrow a is effected against the spring force of an air column in the cylinder 24 in order to permit adjustment in the direction of arrow b. This spring force pushes the sensor carrier 21 in the direction of arrow b during an adjustment movement. Arrow f indicates the supply of compressed air to the cylinder 24.

As, in the position shown, the sensor carrier 21 is located at the same distance from the shearing edge 13 as the length stop 9, namely at a distance L, the Bowden cable arrangement described makes sure that even when adjusting the length stop 9 to a different billet length L, the sensor carrier 21, or more accurately the beam exiting along line m always will maintain the same spacing L from the shearing edge 13.

In FIGS. 2 to 5 the hot shearing apparatus 1 is used with all the details shown in FIG. 1 and described above. The only difference is that the sensor carrier 12, instead of being provided with one sensor 22, carries two sensors 122a, 122b located at a spacing $21_z$, the position of these sensors being indicated $m_1$ and $m_2$ in FIGS. 2 to 5. The mean spacing of this sensor arrangement from the shearing edge 13 still is the same as the billet length L adjusted at the length stop 9.

$l_z$ is a symbol to indicate the admissible remnant length which should not be fallen short of in order to avoid transportation problems in the area to the right of the shearing edge 13.

The operation under normal conditions, i.e. without the occurrence of a butt joint between two successive bars will now be described with reference to FIGS. 2a to 2d.

Figure 2B:
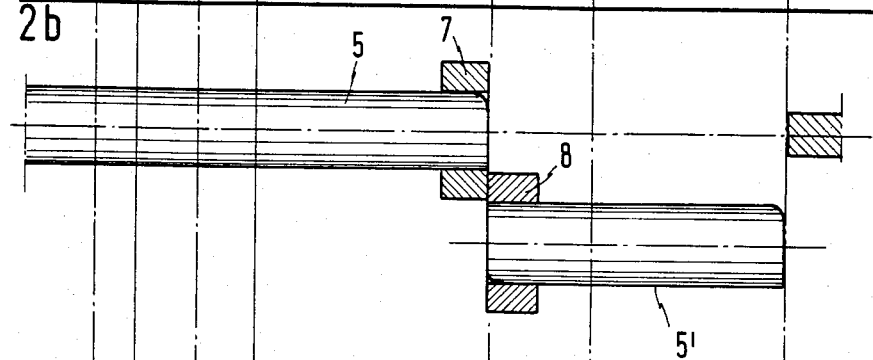

A bar 5 is moved out of the oven through the shearing rings 7, 8 past the shearing edge 13 until its front end face 14 abuts against the length stop 9 adjusted to the billet length L, whereupon, in accordance with my prior U.S. Pat. No. 4,152,959, the hydraulic system 12 of the billet length-responsive shearing means is operated by the stop means 9 to cause a normal cut to be made, the movable shearing ring 8 moving vertically in downward direction with respect to the stationary shearing ring 7, thus shearing off the billet 5' which has the adjusted billet length L (FIG. 2b). During this normal length cutting operation the sensors 122a and 122b do not react since no butt joint s has been sensed prior to the shearing operation.

Figure 2C:
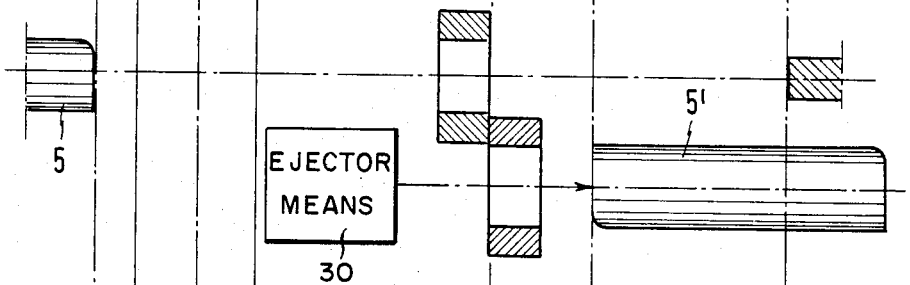

Following the cutting as shown in FIG. 2b, the remaining bar column with bar section 5 is returned by the bar drive means 2 and 102 into the oven to the left. At the same time the sheared billet 5' is discharged to the right by means of an ejector designated 30 in FIG. 1 (FIG. 2c).

Figure 2D:
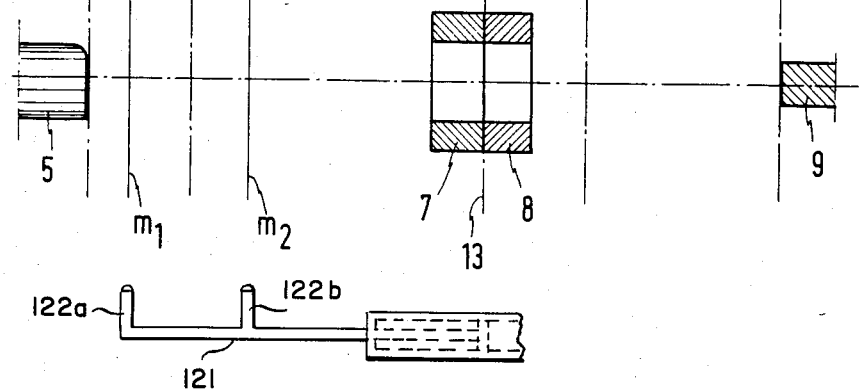

As shown in FIG. 2d, the shearing ring 8 again has been returned to its initial position in alignment with shearing ring 7 so that the hot shearing apparatus is ready for another operating cycle.

FIG. 3 illustrates the operation carried out in the event that a butt joint s between two successive bar sections 5, 6 is moved over both sensors $m_1$ and $m_2$ (i.e., 122a and 122b) of the sensor arrangement.

FIG. 3a shows the position to which the bar column with bar sections 5, 6 has been moved beyond the shearing edge 13, i.e. through the shearing rings 7, 8 to abut against the length stop 9. The butt joint s is located between the shearing edge 13 and sensor $m_2$.

Both sensors $m_1$ and $m_2$ have reacted to the passage of the butt joint s, thereby producing an inhibiting signal to prevent activation of either the drive unit 2, contrary to the usual operation as shown in FIG. 2, or the conveying means 103 in the oven.

As shown in FIG. 3b, now a cut is made to shear off a billet 5' of the correct billet length L, just as is the case when proceeding according to FIG. 1. This leaves a remnant 5" in front of the shearing edge 13.

As the sensors $m_1$, $m_2$ have reacted to the passage of the butt joint s to produce the aforementioned inhibiting signal, the bar column will be left as it is, as shown in FIG. 3c, when the billet 5' subsequently is conveyed in the direction of the press (not shown). This bar column contains the remnant 5" and the successive bar 6.

FIG. 3d shows the billet 5' completely removed and the bar column remaining at the shearing edge 13, as already mentioned.

In the process step shown in FIG. 3e this bar column is advanced by one billet length L and another cut, a so-called "repetitive cut" is made in the next step 3f to shear an initial piece 6' from the bar 6. This initial piece 6' supplements the remnant 5" to provide a correct billet length. The length of the initial piece 6' is such that the handling thereof behind the shearing edge 13 causes no problem.

In analogy to the normal operation illustrated in FIG. 2c the process step shown in FIG. 3g provides for the return of the bar column 6 into the oven by the drive means 2 and 102, and, at the same time, for the removal of a billet of the correct total billet length L composed of pieces 6' and 5".

FIG. 3h again shows the initial position being reached in correspondence with FIG. 2d, the two shearing rings 7, 8 being aligned in ready position to permit the passage of the bar column 6.

FIG. 4 illustrates the operation in the event that a butt joint s is located in an area between sensor $m_1$ and the central line m between the two sensors $m_1$ and $m_2$.

In FIG. 4a the bar column is shown in abutment against the length stop 9 thereby operating the shear means 12 to shear off a billet 5' of the correct billet length L (FIG. 4b).

It follows from FIGS. 4a and 4b that the butt joint s merely passed sensor $m_1$. The response of this sensor has the effect that the bar column now comprising remnant 5'" and the bar 6 in front of it is not conveyed back into the oven to the left when the sheared billet 5' is removed to the right toward the press, as shown in FIG. 4c. The bar rod 5'", 6 is left in front of the shearing edge 13 even after the shearing ring 8 has been returned to its initial position in alignment with shearing ring 7, as shown in FIG. 4d.

The movement past sensor $m_1$ alone has the effect that the drive unit 2 is caused to advance the remnant 5'" through the shearing rings 7, 8 to the right until the left end edge of this remnant just reaches sensor $m_2$. The length of the remnant 5'" positioned in front of the shearing edge 13 now corresponds exactly to L-$l_z$. Bar 6 still remains exactly in the position shown in FIGS. 4b–4d. Sensor $m_2$ emitted a stop signal for drive unit 2 upon arrival of the left front edge of the remnant 5'". As shown in FIG. 4f, now a cut is made to trim the remnant 5'" to the length L-$l_z$ of the remaining remnant $5^{IV}$. This produces a piece of scrap $5^V$ which, as shown in FIG. 4g, first is ejected from the lowered shearing ring 8 and then discharged in downward direction.

FIG. 4h shows the shearing ring 8 returned to its initial position in alignment with shearing ring 7. The piece of scrap $5^V$ has been removed.

During the process step shown in FIG. 4i another advance is made of the bar column now comprising sections $5^{IV}$ and 6 until it abuts against the length stop 9.

Subsequently another cut is made, as shown in FIG. 4k. This is a so-called "corrective cut", cutting off from the beginning of bar 6 a piece 6" which just has the uncritical length $l_z$. This piece 6" supplements the shortened remnant $5^{IV}$ to provide the correct billet length L. As in the case of FIG. 3g, the bar column now is returned into the oven, and the billet of the correct total billet length L composed of pieces 6" and $5_{IV}$ is discharged toward the press.

FIG. 5 illustrates the individual process steps in the event that the butt joint s between the final piece of bar 5 and bar 6 comes to lie between the central line m and sensor $m_2$.

The only difference as compared to FIG. 4 resides in the fact that the remnant 5'" remaining after the first cut shown in FIG. 5b is a little shorter instead of being a little longer than the correct billet length L. Accordingly, the piece of scrap $5^V$ obtained by cutting in accordance with FIG. 5f and removed in accordance with FIG. 5g is smaller. Otherwise the process steps illustrated in FIGS. 5a to 5l are identical with those shown in FIGS. 4a to 4l so that a repetition of the description may be dispensed with.

As shown in FIGS. 3 to 5, therefore, a butt joint s always is detected in the second billet length in front of the length stop 9. If the butt joint is detected by both sensors $m_1$, $m_2$, a single "repetitive cut" only is made. If, on the other hand, the butt joint s comes to lie between the two sensors $m_1$, $m_2$, an additional "corrective cut" is made. This provides a piece of scrap $5^V$ which is removed. It is characteristic of the operating process shown in FIGS. 3 to 5 that the bar column always is left in front of the shearing edge 13 as soon as a butt joint has been detected by one or both sensors.

An arrangement comprising both sensors $m_1$, $m_2$ permits both pieces constituting a billet to be metered such that also the short piece will not cause any difficulties in the handling to the right of the shearing edge 13. An arrangement including a single sensor, as shown in FIG. 1, is sufficient to cause the bar column to be left lying in front of the shearing edge 13 when a butt joint s is moved past the sensor m. This will help avoid difficulties in the handling of short remnants in the area in front of the shearing edge 13.

FIG. 6 shows the process steps of an apparatus modified as compared to FIG. 4 in that an additional sensor $m_3$ (i.e., 222c) is provided at the place of the central line between the two sensors $m_1$ and $m_2$ according to FIG. 4. Also this sensor conveniently is an optical sensor (light barrier).

The process steps illustrated in FIGS. 6a–6d are identical with those shown in FIGS. 4a to 4d, a butt joint being located in an area between the two sensors $m_1$ and $m_3$. These process steps, therefore, are not described again.

Following the process step according to FIG. 6d in this case too, the drive unit 2 is caused to convey the remnant 5''' through the shearing rings 7, 8 to the right. However, in this case it is advanced only until the left front edge of the remnant just reaches sensor $m_3$. The length of the remnant 5''' lying in front of the shearing edge 13 corresponds exactly to the billet length L, i.e. the correct billet length. Bar 6 remains in the position shown in FIGS. 6a–6d. Sensor $m_3$ emitted a stop signal for drive unit 2 as the left front edge of the remnant 5''' arrived.

As shown in FIG. 6f, a cut is made to sever the remnant 5''' so as to provide the correct billet length L of piece $5^{IV}$. This produces a piece of scrap $5^V$ which is much shorter than the corresponding piece of scrap obtained according to FIGS. 4f and 4g. As shown in FIG. 6g, this piece of scrap first is ejected from the lowered shearing ring 8 and then removed in downward direction.

The step illustrated in FIG. 6i is one of renewed advance of the bar column now comprising pieces $5^{IV}$ and 6 until it abuts against the length stop 9, thereby causing a so-called "idling cut" to be made, as shown in FIG. 6k, meaning that the shearing ring 8 does not cut because with this example the butt joint exactly lies at the shearing edge 13, as follows from FIG. 6i. As already mentioned, the piece $5^{IV}$ taken along by the shearing ring 8 in downward direction, as shown by FIG. 6k, has the correct billet length L and is removed in accordance with FIG. 6l, as was the case with the preceding examples.

It is an advantage of the modification according to FIG. 6 as compared to FIG. 4 that the resulting piece of scrap $5^V$ is much shorter. This advantage is obtained at the expense of the additional sensor $m_3$ at the central location between sensors $m_1$ and $m_2$.

What is claimed is:

1. In the method of shearing hot metal bars by length-responsive shearing means (7–9) to form billets, the bars normally being returned to an oven (100) following the billet-shearing operation;

the improvement which comprises the steps of:
(a) displacing first (5) and subsequent (6) colinearly arranged contiguous bars longitudinally outwardly of said oven to cause the leading edge of the first bar to pass through the shearing plane (13) of a shearing station toward a position in which the forward edge of the first bar is spaced a given distance (L) beyond said shearing plane, and simultaneously detecting during a first detection period whether the butt joint (s) defined between the trailing edge of said first bar and the leading edge of the subsequent bar has entered a permissible zone intermediate said shearing plane and said oven, said zone being generally spaced said given distance (L) from said shearing plane;
(b) shearing from said first bar a billet having a length (L) corresponding with said given distance, thereby to define a remnant portion of said first bar having a trailing edge intermediate said shearing plane and said oven;
(c) inhibiting the return of said subsequent bar (6) to the oven in the event that a butt joint was detected within said permissible zone during the first detection period;
(d) displacing said remnant portion by the forward portion of the subsequent bar (6) beyond the shearing plane to a position in which the forward edge of the remnant portion is spaced said given distance (L) from said shearing station, and simultaneously detecting during a second detecting period whether or not the butt joint between the trailing edge of the remnant portion and the leading edge of said subsequent bar had entered the permissible zone;
(e) shearing said subsequent bar forward portion and combining the same with said remnant to define a second billet of said given length; and
(f) returning said subsequent bar to said oven in the event that no butt joint was detected within said permissible zone during the second detection period.

2. The method as defined in claim 1, wherein the permissible zone includes the given distance (L) plus an admissible remnant length ($l_Z$).

3. The method as defined in claim 2, wherein said permissible zone includes said admissible remnant length ($l_Z$).

4. The method as claimed in claim 3, wherein the event that the butt joint (s) is positioned within said permissible zone and upon shearing of the final section which has been advanced up to the length limit and provides a normal billet length (L), the remaining remnant (5''') is conveyed from the butt joint (3) past the shearing edge by such a distance that it stops upstream of the shearing edge by a length which is shorter than the correct billet length by the permissible remnant length ($l_Z$), wherein in this position a piece of scrap ($5^V$) is sheared from the remnant, and wherein during the next shearing process an initial piece (6'') of the admissible remnant length ($l_Z$) is sheared from the subsequent bar to supplement the shortened remnant ($5^{IV}$) to the billet length (L) prescribed.

5. In an apparatus including length-responsive shearing means (7, 8, 9) for shearing billets of given length (L) from heated bars, and conveyor means (2, 102) for normally returning the bars to an oven (100) following the billet shearing operation;

the improvement wherein said conveyor means are operable to simultaneously longitudinally displace first (5) and subsequent (6) colinearly arranged contiguous bars outwardly of said oven to cause the leading edge of said first bar to pass through the shearing plane (13) of said shearing means toward a shearing position in which the forward edge of the first bar engages a stop (9) spaced a distance beyond said shearing plane equal to the given distance (L), whereupon said length-responsive shearing means operates to sever a billet from said first bar, said conveyor means normally being operable after the shearing operation to return at least said subsequent bar to the oven;

and further including (a) detector means (22, 122, 222) for detecting whether or not the butt joint (s) defined between the trailing and leading edges of said first and subsequent bars entered a permissible zone during a first detection period when said first bar was displaced toward said shearing position, said permissible zone being arranged between said shearing means and said oven and being generally spaced said given distance (L) from said shearing means, said detector means being operable to inhibit the return of said subsequent bar to said oven in the event that a butt joint was detected within said permissible zone during said first detection period;

(b) said conveying means being operable to displace the remnant portion of said first bar defined by the first billet shearing operation and said subsequent bar (6) to a shearing position in which the forward edge of said remnant portion is spaced said given distance (L) from said shearing plane, whereupon following a second length-responsive severing operation, the remnant and the forward portion of the subsequent bar are combined to form a second billet;

(c) said detector means being operable to permit return of said subsequent bar to said oven following said second shearing operation in the absence of the detection of a butt joint within said permissible zone during the second displacement period.

6. The apparatus as claimed in claim 5, wherein a first sensor ($m_1$) is disposed one billet length (L) plus an admissible remnant length ($l_z$) upstream of the shearing plane and a second sensor ($m_2$) is disposed one billet length (L) minus an admissible remnant length ($l_z$) upstream of the shearing plane.

7. The apparatus as claimed in claim 6, wherein a third sensor ($m_3$) is disposed one billet length (L) upstream of the shearing plane.

8. The apparatus as claimed in claim 6, wherein the sensors are formed by light barriers, and wherein the conveying means comprises a drive unit (2) adapted to be driven at greater speed than the normal speed of the bar column such that a gap detectable by the light barriers is formed upon occurrence of a butt joint.

9. The apparatus as claimed in claim 5, including a length stop adjustable to different billet lengths (L) at the hot shearing apparatus, wherein a transmission (19) is provided which automatically adjusts the mean spacing of the two metering stations ($m_1, m_2$) from the shearing edge (13) upon adjustment of the length stop (9) such that the mean spacing will always correspond to the billet length (L) set.

10. The apparatus as claimed in claim 9, wherein the transmission comprises a Bowden cable (19) which is fixed by one driven end (18) to the length stop (9) and by the other end (20) to a sensor support (21).

11. The apparatus as claimed in claim 10, wherein the end of the Bowden cable fixed to the sensor support (21) is displaceable by spring force, particularly of a compressed air spring (24) as the Bowden cable (19) is pushed in at the end (18) fixed to the length stop.

12. The apparatus as claimed in claim 5, wherein a first sensor ($m_1$) is disposed one billet length (L) plus an admissible remnant length ($l_z$) upstream of the shearing edge, a second sensor ($m_2$) is disposed one billet length (L) minus an admissible remnant length ($l_z$) upstream of the shearing edge, and a third sensor ($m_3$) is disposed one billet length (L) upstream of the shearing edge.

* * * * *